(12) United States Patent
Park et al.

(10) Patent No.: US 10,718,415 B2
(45) Date of Patent: Jul. 21, 2020

(54) DUAL CLUTCH TRANSMISSION

(71) Applicants: Hyundai Motor Company, Seoul (KR); Kia Motors Corporation, Seoul (KR)

(72) Inventors: Ju Hyeon Park, Suwon-si (KR); Seong Wook Ji, Gunpo-si (KR); Ki Tae Kim, Incheon (KR); Dong Woo Kim, Incheon (KR); Hyun Sik Kwon, Seoul (KR); Il Han Yoo, Hwasun-gun (KR); Seong Wook Hwang, Gunpo-si (KR); Won Min Cho, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 72 days.

(21) Appl. No.: 16/191,310

(22) Filed: Nov. 14, 2018

(65) Prior Publication Data
US 2020/0039342 A1 Feb. 6, 2020

(30) Foreign Application Priority Data

Aug. 1, 2018 (KR) .......................... 10-2018-0089897

(51) Int. Cl.
| | |
|---|---|
| *F16H 37/08* | (2006.01) |
| *B60K 6/547* | (2007.10) |
| *F16H 3/00* | (2006.01) |
| *B60K 6/48* | (2007.10) |
| *B60K 6/365* | (2007.10) |

(52) U.S. Cl.
CPC ......... *F16H 37/0833* (2013.01); *B60K 6/365* (2013.01); *B60K 6/48* (2013.01); *B60K 6/547* (2013.01); *F16H 3/006* (2013.01); *F16H 37/0826* (2013.01); *B60Y 2200/92* (2013.01); *F16H 2200/2005* (2013.01); *F16H 2200/2043* (2013.01)

(58) Field of Classification Search
CPC ........................ F16H 37/0826; F16H 37/0833
See application file for complete search history.

(56) References Cited

U.S. PATENT DOCUMENTS 10,047,840 B2 * 8/2018 Gumpoldsberger .... F16H 3/093

FOREIGN PATENT DOCUMENTS

KR 10-2008-0033700 A 4/2008

* cited by examiner

*Primary Examiner* — Erin D Bishop
(74) *Attorney, Agent, or Firm* — Morgan, Lewis & Bockius LLP

(57) ABSTRACT

A dual clutch transmission which can reduce the overall length of a transmission and improve mountability in the vehicle by simplifying the constituent elements of the transmission, is configured by reducing the number of synchronizers and external gears and shafts, and a drive motor is not disposed on the same axle as other constituent elements to reduce the overall length of the transmission, reducing cost and weight of the transmission to improve mountability of the transmission in the vehicle.

14 Claims, 21 Drawing Sheets

FIG. 2

| SHIFT STAGE | FIRST CLUTCH (C1) | SECOND CLUTCH (C2) | THIRD CLUTCH (C3) | FOURTH CLUTCH (C4) | BRAKE (B1) | FIRST SYNCHRONIZER (SY1) | | | SECOND SYNCHRONIZER (SY2) | | |
|---|---|---|---|---|---|---|---|---|---|---|---|
| | | | | | | 1st / 7th | N | 3rd / 5th | 2nd / 6th | N | 9th / Rev |
| REVERSE STAGE | | ● | | ● | | ● | | | | | ● |
| FIRST SHIFT STAGE | ● | | | ● | | ● | | | ○ | ● | ○ |
| SECOND SHIFT STAGE | | ● | | ● | | ○ | | | ● | | |
| THIRD SHIFT STAGE | ● | | | ● | | | ● | ○ | ○ | | ○ |
| FOURTH SHIFT STAGE | | | ● | ● | | ○ | | ● | ○ | ● | |
| FIFTH SHIFT STAGE | ● | | ● | | | | ● | ○ | ○ | ● | ○ |
| SIXTH SHIFT STAGE | | | ● | | | ○ | | ● | ● | | |
| SEVENTH SHIFT STAGE | | | ● | | | ● | | ○ | ○ | ● | ○ |
| EIGHTH SHIFT STAGE | | | ● | | ● | ○ | | | ○ | ● | ○ |
| NINTH SHIFT STAGE | | ● | ● | | | ● | | | | | ● |

○ : PRE-ENGAGEMENT POSSIBLITY

FIG. 4

| | SHIFT STAGE | FIRST CLUTCH (C1) | SECOND CLUTCH (C2) | THIRD CLUTCH (C3) | FOURTH CLUTCH (C4) | BRAKE (B1) | FIRST SYNCHRONIZER(SY1) 1st 7th | FIRST SYNCHRONIZER(SY1) N | FIRST SYNCHRONIZER(SY1) 3rd 5th | SECOND SYNCHRONIZER(SY2) 2nd 6th | SECOND SYNCHRONIZER(SY2) N | SECOND SYNCHRONIZER(SY2) 9th Rev |
|---|---|---|---|---|---|---|---|---|---|---|---|---|
| ENGINE MODE/PARALLEL MODE | REVERSE STAGE | | ● | | ● | | ● | | | | | ● |
| | FIRST SHIFT STAGE | ● | | | ● | | ● | | | | ● | ○ |
| | SECOND SHIFT STAGE | | ● | | ● | | ○ | ● | | ● | | |
| | THIRD SHIFT STAGE | ● | | | ● | | | ● | ○ | | ● | ○ |
| | FOURTH SHIFT STAGE | | | ● | ● | | ○ | | ● | ○ | ● | ○ |
| | FIFTH SHIFT STAGE | ● | | ● | | | | ● | ○ | ○ | ● | ○ |
| | SIXTH SHIFT STAGE | | ● | ● | | | ○ | | ○ | ● | | |
| | SEVENTH SHIFT STAGE | ● | | ● | | | ● | ● | | ○ | ● | ○ |
| | EIGHTH SHIFT STAGE | | ● | ● | | | ○ | ● | ○ | ○ | ● | ● |
| | NINTH SHIFT STAGE | | | ● | | ● | ● | | ○ | ○ | | ● |
| e-CVT | D | | | ● | | | ○ | ● | ○ | ○ | ● | ○ |
| EV | D/R | | | | | | ○ | ● | ○ | ○ | ● | ○ |

○ : PRE-ENGAGEMENT POSSIBLITY

FIG. 6

| | SHIFT STAGE | ENGINE CLUTCH (EC) | FIRST CLUTCH (C1) | SECOND CLUTCH (C2) | THIRD CLUTCH (C3) | FOURTH CLUTCH (C4) | BRAKE (B1) | FIRST SYNCHRONIZER (SY1) ||| SECOND SYNCHRONIZER (SY2) |||
|---|---|---|---|---|---|---|---|---|---|---|---|---|---|
| | | | | | | | | 1st 7th | N | 3rd 5th | 2nd 6th | N | 9th Rev |
| ENGINE MODE/PARALLEL MODE | REVERSE STAGE | ● | | ● | | ● | | ● | | | | | ● |
| | FIRST SHIFT STAGE | ● | ● | | | ● | | ● | | | ○ | ● | ○ |
| | SECOND SHIFT STAGE | ● | | ● | | ● | | ○ | | | ● | | |
| | THIRD SHIFT STAGE | ● | ● | | | ● | | | ● | ○ | ○ | ● | ○ |
| | FOURTH SHIFT STAGE | ● | | | ● | ● | | ○ | | ● | ○ | ● | ○ |
| | FIFTH SHIFT STAGE | ● | ● | | ● | | | | ● | ○ | ○ | ● | ○ |
| | SIXTH SHIFT STAGE | ● | | | ● | | | ○ | | ○ | ● | | |
| | SEVENTH SHIFT STAGE | ● | ● | | ● | | | ● | ● | ○ | ○ | ● | ○ |
| | EIGHTH SHIFT STAGE | ● | | | ● | | ● | ○ | | | ○ | ● | ○ |
| | NINTH SHIFT STAGE | ● | | ● | ● | | | ● | | | | | ● |

○ : PRE-ENGAGEMENT POSSIBLITY

FIG. 7

| SHIFT STAGE | | ENGINE CLUTCH (EC) | FIRST CLUTCH (C1) | SECOND CLUTCH (C2) | THIRD CLUTCH (C3) | FOURTH CLUTCH (C4) | BRAKE (B1) | FIRST SYNCHRONIZER (SY1) | | | SECOND SYNCHRONIZER (SY2) | | |
|---|---|---|---|---|---|---|---|---|---|---|---|---|---|
| | | | | | | | | 1st 7th | N | 3rd 5th | 2nd 6th | N | 9th Rev |
| EV MODE | REVERSE STAGE | | | ● | | ● | | ● | | | | | ● |
| | FIRST SHIFT STAGE | | ● | | | ● | | ● | | | ○ | ● | ○ |
| | SECOND SHIFT STAGE | | | ● | | ● | | ○ | | ○ | ● | | |
| | THIRD SHIFT STAGE | | ● | | | ● | | | | ● | ○ | ● | ○ |
| | FOURTH SHIFT STAGE | | | | ● | ● | | ○ | ● | ○ | ○ | ● | ○ |
| | FIFTH SHIFT STAGE | | ● | | ● | | | | ● | ● | ○ | ● | ○ |
| | SIXTH SHIFT STAGE | | | ● | ● | | | ○ | ● | ○ | ● | | |
| | SEVENTH SHIFT STAGE | | ● | | ● | | | ● | | ○ | ○ | ● | ○ |
| | EIGHTH SHIFT STAGE | | | | ● | | ● | ○ | ● | ○ | ○ | ● | ○ |
| | NINTH SHIFT STAGE | | | ● | ● | | | ● | | | ○ | | ● |

○ : PRE-ENGAGEMENT POSSIBLITY

FIG. 9

| SHIFT STAGE | FIRST CLUTCH (C1) | SECOND CLUTCH (C2) | THIRD CLUTCH (C3) | FOURTH CLUTCH (C4) | BRAKE (B1) | FIRST SYNCHRONIZER(SY1) 1st/7th | FIRST SYNCHRONIZER(SY1) N | FIRST SYNCHRONIZER(SY1) 3rd/5th | SECOND SYNCHRONIZER(SY2) 2nd/6th | SECOND SYNCHRONIZER(SY2) N | SECOND SYNCHRONIZER(SY2) 9th/Rev |
|---|---|---|---|---|---|---|---|---|---|---|---|
| REVERSE STAGE | | ● | | ● | | ● | | | | | ● |
| FIRST SHIFT STAGE | ● | | | ● | | ● | | | ○ | ● | ○ |
| SECOND SHIFT STAGE | ● | ● | | ● | | ○ | | | ● | | |
| THIRD SHIFT STAGE | ● | | | ● | | | ● | ○ | ○ | ● | ○ |
| FOURTH SHIFT STAGE | ● | | | ● | | ○ | | ● | ○ | ● | ○ |
| FIFTH SHIFT STAGE | ● | | ● | | | | ● | ○ | ○ | ● | ○ |
| SIXTH SHIFT STAGE | | ● | ● | | | ○ | | ● | ● | | |
| SEVENTH SHIFT STAGE | | | ● | | | ● | | ○ | ○ | ● | ○ |
| EIGHTH SHIFT STAGE | | ● | ● | | | ● | | | | | ● |

○ : PRE-ENGAGEMENT POSSIBILITY

FIG. 11

| SHIFT STAGE | FIRST CLUTCH (C1) | SECOND CLUTCH (C2) | THIRD CLUTCH (C3) | FOURTH CLUTCH (C4) | BRAKE (B1) | SYNCHRONIZER | | |
|---|---|---|---|---|---|---|---|---|
| | | | | | | 2nd 4th | N | 7th Rev |
| REVERSE STAGE | | ● | | ● | | | | ● |
| FIRST SHIFT STAGE | ● | | | ● | | ○ | ● | ○ |
| SECOND SHIFT STAGE | | ● | | ● | | ● | | |
| THIRD SHIFT STAGE | | | ● | ● | | ○ | ● | ○ |
| FOURTH SHIFT STAGE | | ● | ● | | | ● | | |
| FIFTH SHIFT STAGE | ● | | ● | | | ○ | ● | ○ |
| SIXTH SHIFT STAGE | | | ● | | ● | ○ | ● | ○ |
| SEVENTH SHIFT STAGE | | ● | ● | | | | | ● |

○ PRE-ENGAGEMENT POSSIBLITY

FIG. 13

| SHIFT STAGE | FIRST CLUTCH (C1) | SECOND CLUTCH (C2) | THIRD CLUTCH (C3) | FOURTH CLUTCH (C4) | BRAKE (B1) | SYNCHRONIZER | | |
|---|---|---|---|---|---|---|---|---|
| | | | | | | 2nd 4th | N | 7th Rev |
| REVERSE STAGE | | ● | | ● | | | | ● |
| FIRST SHIFT STAGE | ● | | | ● | | ○ | ● | ○ |
| SECOND SHIFT STAGE | | ● | | ● | ● | ● | | |
| THIRD SHIFT STAGE | | | ● | ● | | ○ | ● | ○ |
| FOURTH SHIFT STAGE | | ● | ● | | ● | ● | | |
| FIFTH SHIFT STAGE | ● | | ● | | | ○ | ● | ○ |
| SIXTH SHIFT STAGE | | ● | ● | | | ○ | | ● |

○ PRE-ENGAGEMENT POSSIBLITY

FIG. 15

| SHIFT STAGE | FIRST CLUTCH (C1) | SECOND CLUTCH (C2) | THIRD CLUTCH (C3) | FOURTH CLUTCH (C4) | BRAKE (B1) |
|---|---|---|---|---|---|
| FIRST SHIFT STAGE | ● | | | ● | |
| SECOND SHIFT STAGE | | ● | | ● | |
| THIRD SHIFT STAGE | | | ● | ● | |
| FOURTH SHIFT STAGE | | ● | ● | | |
| FIFTH SHIFT STAGE | ● | | ● | | |
| SIXTH SHIFT STAGE | | | ● | | ● |

FIG. 17

| SHIFT STAGE | FIRST CLUTCH (C1) | SECOND CLUTCH (C2) | THIRD CLUTCH (C3) | FOURTH CLUTCH (C4) |
|---|---|---|---|---|
| FIRST SHIFT STAGE | ● | | | ● |
| SECOND SHIFT STAGE | | ● | | ● |
| THIRD SHIFT STAGE | | | ● | ● |
| FOURTH SHIFT STAGE | | ● | ● | |
| FIFTH SHIFT STAGE | ● | | ● | |

FIG. 19

| SHIFT STAGE | FIRST CLUTCH (C1) | SECOND CLUTCH (C2) | THIRD CLUTCH (C3) | BRAKE (B1) |
|---|---|---|---|---|
| FIRST SHIFT STAGE | ● | | ● | |
| SECOND SHIFT STAGE | | ● | ● | |
| THIRD SHIFT STAGE | ● | ● | | |
| FOURTH SHIFT STAGE | | ● | | ● |

FIG. 21

| SHIFT STAGE | FIRST CLUTCH (C1) | SECOND CLUTCH (C2) | THIRD CLUTCH (C3) | BRAKE (B1) |
|---|---|---|---|---|
| FIRST SHIFT STAGE | ● | | ● | |
| SECOND SHIFT STAGE | | ● | ● | |
| THIRD SHIFT STAGE | ● | ● | | |
| FOURTH SHIFT STAGE | | ● | | ● |

DUAL CLUTCH TRANSMISSION

CROSS REFERENCE TO RELATED APPLICATION

The present application claims priority to Korean Patent Application No. 10-2018-0089897 filed on Aug. 1, 2018, the entire contents of which is incorporated herein for all purposes by this reference.

BACKGROUND OF THE INVENTION

Field of the Invention

The present invention relates to a dual clutch transmission configured for simplifying constituent elements of a transmission to reduce an overall length of the transmission and to improve mountability of the transmission in a vehicle.

Description of Related Art

An automated manual transmission is automatically shifted by an actuator while driving a vehicle to provide similar driving comfort as an automatic transmission and can contribute to the improvement of fuel efficiency of the vehicle with the power delivery efficiency superior to the automatic transmission.

The Dual Clutch Transmission (DCT) can perform the shifting through the handover control for cross-controlling the two clutches during the shifting of the gear, preventing a reduction in the shift feeling caused by the power disconnection of the engine.

However, in the case of a conventional DCT structure, since a dual clutch and a plurality of external gears and a plurality of synchronizers are disposed on the same axle (an input shaft and output shaft), so that the overall length of the transmission is increased, there was a more unfavorable problem on the overall length when adding a drive motor.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a dual clutch transmission configured for simplifying constituent elements of a transmission to reduce an overall length of the transmission and to improve mountability of the transmission in a vehicle.

A dual clutch transmission according to an exemplary embodiment of the present inventions may include a first input shaft and a second input shaft to which a rotational power of an engine is selectively inputted through a first clutch and a second clutch to rotate; an idle shaft and a countershaft disposed in parallel with the first and second input shafts; an output shaft selectively connectable to the countershaft through a fourth clutch; a planetary gear set provided with three rotation elements of which a first rotation element is connected to a gear provided in the idle shaft so that a rotational power is inputted thereto, the rotational power of the engine is selectively inputted to a second rotation element through a third clutch and a third rotation element is connected to the output shaft; one or more first external gear sets, in which two or more external gears among of external gears provided in the first input shaft, the idle shaft and the countershaft are engaged in engagement state, selected by a connecting or disconnecting device; a second external gear set, in which two or more external gears among of an external gear connected to one rotation element of the rotation elements of the planetary gear set and external gears provided in the idle shaft and the countershaft are engaged in engagement state, selected by a connecting or disconnecting device; and a third external gear set, in which the external gears of the second input shaft and the idle shaft are engaged in engagement state, selected by a connecting or disconnecting device.

A brake connected between the countershaft and a transmission housing to selectively brake the countershaft, may be further included.

A drive motor connected to the first rotation element of the planetary gear set to provide a rotational power, may be further included.

A motor input shaft may be disposed in parallel with the first input shaft; the motor input shaft may be provided with a motor input gear; the drive motor may be directly connected to the motor input shaft to provide the rotational power to the motor input gear; and the motor input gear may be engaged with the external gear of the second external gear set directly connected to the first rotation element.

A drive motor directly connected to the first clutch and the second clutch to provide a rotation power and an engine clutch disposed between the engine and the drive motor to selectively transmit the rotational power of the engine, may be further included.

The planetary gear set may be a pair of single pinion planetary gear set of which the first, second, and third rotation elements are a sun gear, a planet carrier and a ring gear and disposed on the same axle with the first and second input shafts.

The planetary gear set may be disposed between the second external gear set and the third external gear set; and the sun gear may be directly connected to any one external gear of the second external gear set, the planet carrier may be directly connected to the third clutch and the ring gear may be directly connected to an external gear provided in the output shaft.

The first external gear set may include a 1-1 external gear set in which a 1-1 input gear provided in the first input shaft and a 1-1 counter gear provided in the countershaft are engaged in engagement state but a corresponding external gear mate is selected through a first synchronizer provided in the countershaft, and a first idle gear provided in the idle shaft and the 1-1 counter gear provided in countershaft are engaged in engagement state but a corresponding external gear mate is selected through a second synchronizer provided in the idle shaft; and a 1-2 external gear set in which a 1-2 input gear provided in the first input shaft and a 1-2 counter gear provided in the countershaft are engaged in engagement state but a corresponding external gear mate is selected through the first synchronizer provided in the countershaft.

In the second external gear set, a second input gear directly connected to the first rotation element of the planetary gear set and a second counter gear directly connected to the countershaft are engaged in engagement state, the second counter gear and the output shaft are disposed on the same axle, and the countershaft and the output shaft are selectively connectable to each other through a fourth clutch provided therebetween; and a second idle gear provided in the idle shaft and the second counter gear provided in the countershaft are engaged in engagement state and a corresponding external gear mate is selected through a second synchronizer provided in the idle shaft.

In the third external gear set, a third input gear provided in the second input shaft and a third idle gear provided in the idle shaft are engaged in engagement state, and a rotational power is transmitted to a corresponding external gear mate through the second clutch.

A gear ratio transmitted to an output element of the planetary gear set via the third external gear set and the second external gear set through the second clutch and a gear ratio transmitted to the output element of the planetary gear set through the third clutch may be equal to each other.

A dual clutch transmission according to another exemplary embodiment of the present invention may include a first input shaft and a second input shaft to which a rotational power of an engine is selectively inputted through a first clutch and a second clutch to rotate; a countershaft disposed in parallel with the first and second input shafts; an output shaft selectively connectable to the countershaft through a third clutch; a planetary gear set provided with three rotation elements of which a first rotation element is connected to the input shaft so that a rotational power is selectively inputted thereto, a second rotation element is connected to the second input shaft so that a rotational power is selectively inputted thereto and a third rotation element is connected to the output shaft; and an external gear set in which external gears provided in the first input shaft and the countershaft are engaged in engagement state.

A brake connected between the countershaft and a transmission housing to selectively brake the countershaft, may be further included.

In the external gear set, an input gear directly connected to the first input shaft and a counter gear directly connected to the countershaft are engaged in engagement state but the countershaft and the output shaft are disposed on the same axle, so that the countershaft and the output shaft are selectively connectable to each other through a third clutch disposed therebetween.

The present invention through the above-mentioned problem solving means configures a transmission by reducing the number of synchronizers, external gears and shafts compared to a general DCT structure using only external gears and reduces the overall length of the transmission by a drive motor not coaxially disposed with other constituent elements, so that cost and weight of the transmission is reduced, improving mountability of the transmission in the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a shifting operation chart of the transmission shown in FIG. 1;

FIG. 4 is a shifting operation chart of the transmission shown in FIG. 3;

FIG. 6 and FIG. 7 are shifting operation charts of the transmission shown in FIG. 5;

FIG. 9 is a shifting operation chart of the transmission shown in FIG. 8;

FIG. 11 is a shifting operation chart of the transmission shown in FIG. 10;

FIG. 13 is a shifting operation chart of the transmission shown in FIG. 12;

FIG. 15 is a shifting operation chart of the transmission shown in FIG. 14;

FIG. 17 is a shifting operation chart of the transmission shown in FIG. 16;

FIG. 19 is a shifting operation chart of the transmission shown in FIG. 18;

FIG. 21 is a shifting operation chart of the transmission shown in FIG. 20.

Figure 1:
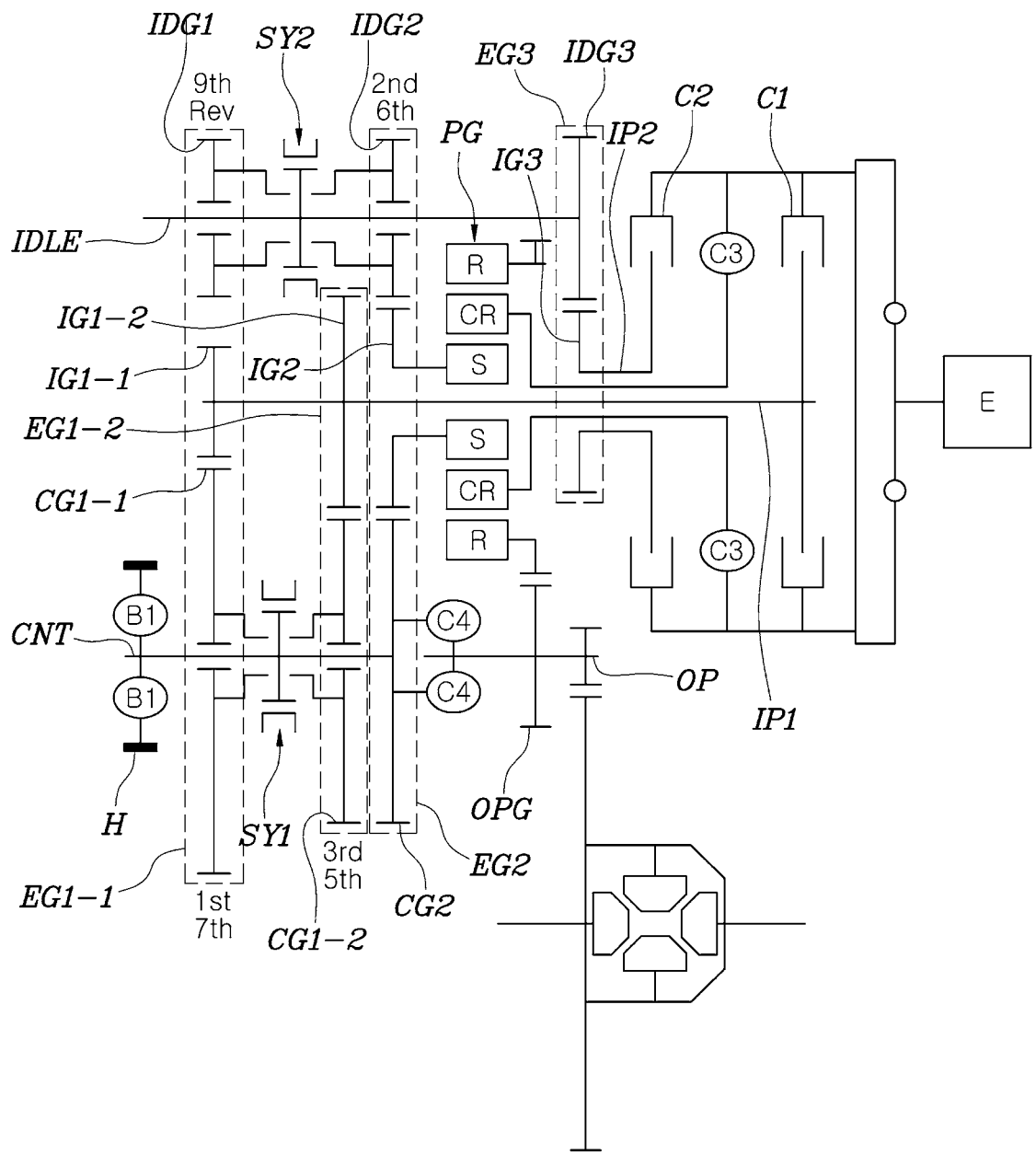
FIG. 1 is a drawing showing a dual clutch transmission structure of nine forward speeds according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Exemplary embodiments of the present invention will be described in detail with reference to the attached drawing.

A dual clutch transmission of the present invention may be configured to include a first input shaft IP1 and a second input shaft IP2, an idle shaft IDLE and a countershaft CNT, an output shaft OP, a planetary gear set PG and three external gear sets.

Explaining the present invention in detail referring to FIG. 1 to FIG. 2, firstly, the first input shaft IP1 and the second input shaft IP2 selectively receives a torque of an engine E through a dual clutch. For example, a first clutch C1, which connects or disconnects the first input shaft IP1 and the engine E, may be positioned therebetween to be rotatable, and a second clutch C2, which connects or disconnects the second input shaft IP2 and the engine E, may be positioned therebetween to be rotatable.

The first input shaft IP1 and the second input shaft IP2 may be disposed on a concentric axle, and the first input shaft IP1 may be formed of a solid shaft and the second input shaft IP2 may be formed of a hollow shaft so that the first input shaft IP1 is inserted into the second input shaft IP2.

Furthermore, the idle shaft IDLE and the countershaft CNT may be disposed side by side on the side of the first input shaft IP1 and the second input shaft IP2.

Additionally, the output shaft OP may be selectively connectable to countershaft CNT via the fourth clutch C4, and a final reduction gear externally engaged with a differential device OP together with an output gear OPG may be directly connected to the output shaft.

At the instant time, the output shaft OP and the countershaft CNT may be disposed in parallel on the same axle, and the output shaft OP may be disposed closer to the engine E than the countershaft CNT.

The planetary gear set PG may include three rotation elements of which a first rotation element may be connected to an external gear provided at the idle shaft IDLE so that a rotating power may be inputted, a rotational power of engine E may be selectively inputted to a second rotation element via the third clutch C3, and a third rotation element may be connected to the output shaft OP.

The planetary gear set PG may be a pair of single pinion planetary gear set of which the first, second, and third rotation elements include a sun gear S, a planet carrier CR and a ring gear R and may be disposed on the same axle together with the first and second input shafts.

Additionally, the first external gear set EG1 may be provided with at least one, and at least two external gears among of the external gears provided at the first input shaft IP1 and the idle shaft IDLE and the countershaft CNT may be engaged in the engagement state so that the corresponding external gear mate may be selected by a connecting or disconnecting device.

For example, the external gear provided at the first input shaft IP1 and the external gear provided at the countershaft CNT may be engaged, and also, the external gear provided at the idle shaft IDLE and the external gear provided at the countershaft CNT may be engaged.

Herein, the connecting or disconnecting device to be described below may be an engagement element in which engagement and disengagement operations are selectively achieved such as a synchronizer, a wet clutch, and the like.

Next, in the second external gear set EG2, the external gear connected to one among of the rotation elements of the planetary gear set PG and at least two external gears among of the external gears provided at the idle shaft IDLE and the countershaft CNT may be engaged in engagement state, so that the corresponding external gear mate may be selected by the connecting or disconnecting device.

For example, one rotation element of the planetary gear set PG and the external gear provided at the countershaft CNT may be engaged, and also, the external gear provided at the idle shaft IDLE and the external gear provided at the countershaft CNT may be engaged.

Furthermore, in a third external gear set EG3, the external gears of the second input shaft IP2 and the idle shaft IDLE may be engaged in engagement state, so that the corresponding external gear mate may be selected by the connecting or disconnecting device.

Furthermore, the present invention may be configured to include a brake B1 connected to between the countershaft CNT and a transmission housing H to selectively brake the countershaft CNT.

That is, according to the above structure, nine forward speeds and one reverse speed are implemented by five connecting or disconnecting devices including a dual clutch, a pair of planetary gear sets, a synchronizer (two clutches, one brake, two synchronizers) and combination of the external gears, so that the number of a synchronizer, external gear and shaft may be reduced compared to a conventional DCT structure that only utilizes external gears, reducing the cost and weight of the transmission and improving mountability of the transmission in the vehicle.

Meanwhile, the present invention may additionally install a drive motor M.

As various exemplary embodiments disposing the drive motor M, the drive motor M may be configured to be connected to the first rotation element of the planetary gear set PG to provide a rotational power.

Figure 3:
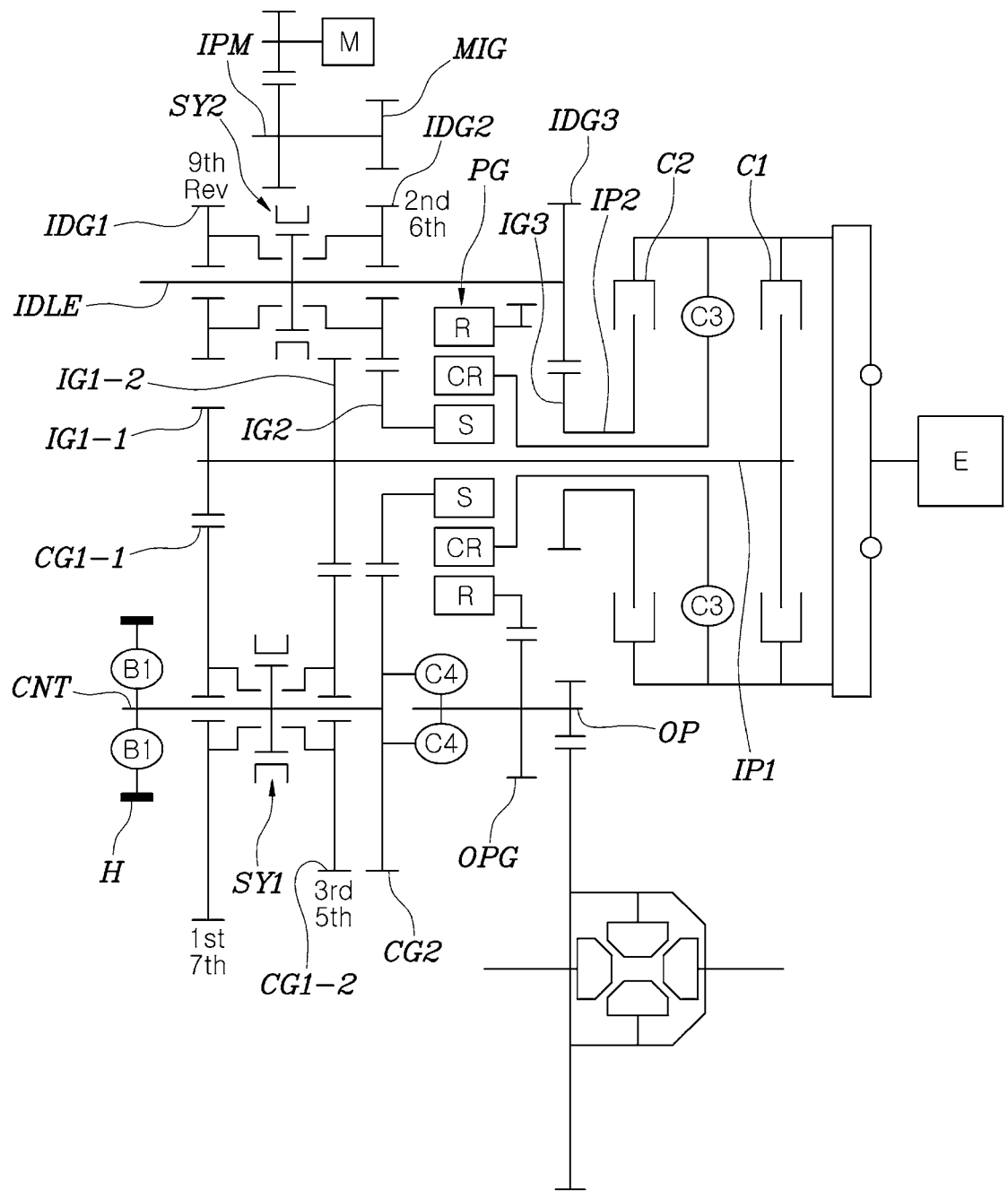
FIG. 3 is a drawing of various exemplary embodiments structure of a hybrid dual clutch transmission of nine forward speeds according to an exemplary embodiment of the present invention.

To explain referring to FIG. 3 and FIG. 4, a motor input shaft IPM may be disposed side by side on the side of the first input shaft, and the motor input shaft IPM may be directly connected to the motor input gear MIG. Furthermore, the motor input shaft IPM may be directly connected to the drive motor M so that the motor input gear MIG is provided with a rotational power, and the motor input gear MIG may be engaged with the external gear of the second external gear set EG2 directly connected to the first rotation element.

That is, the motor input gear MIG is engaged with the sun gear S of the planetary gear set PG to directly supply a rotational power of the drive motor M to the sun gear S, as shown in FIG. 4, so that the shifting stages of the nine forward speeds and one reverse speed may be formed in an engine mode and a parallel mode, and an e-CVT mode and an EV mode may be implemented.

Furthermore, it is possible to reduce constituent elements of the transmission and the overall length of the transmission by not disposing the drive motor M on the same axle with another constituent elements, improving mountability of the transmission in the vehicle.

Figure 5:
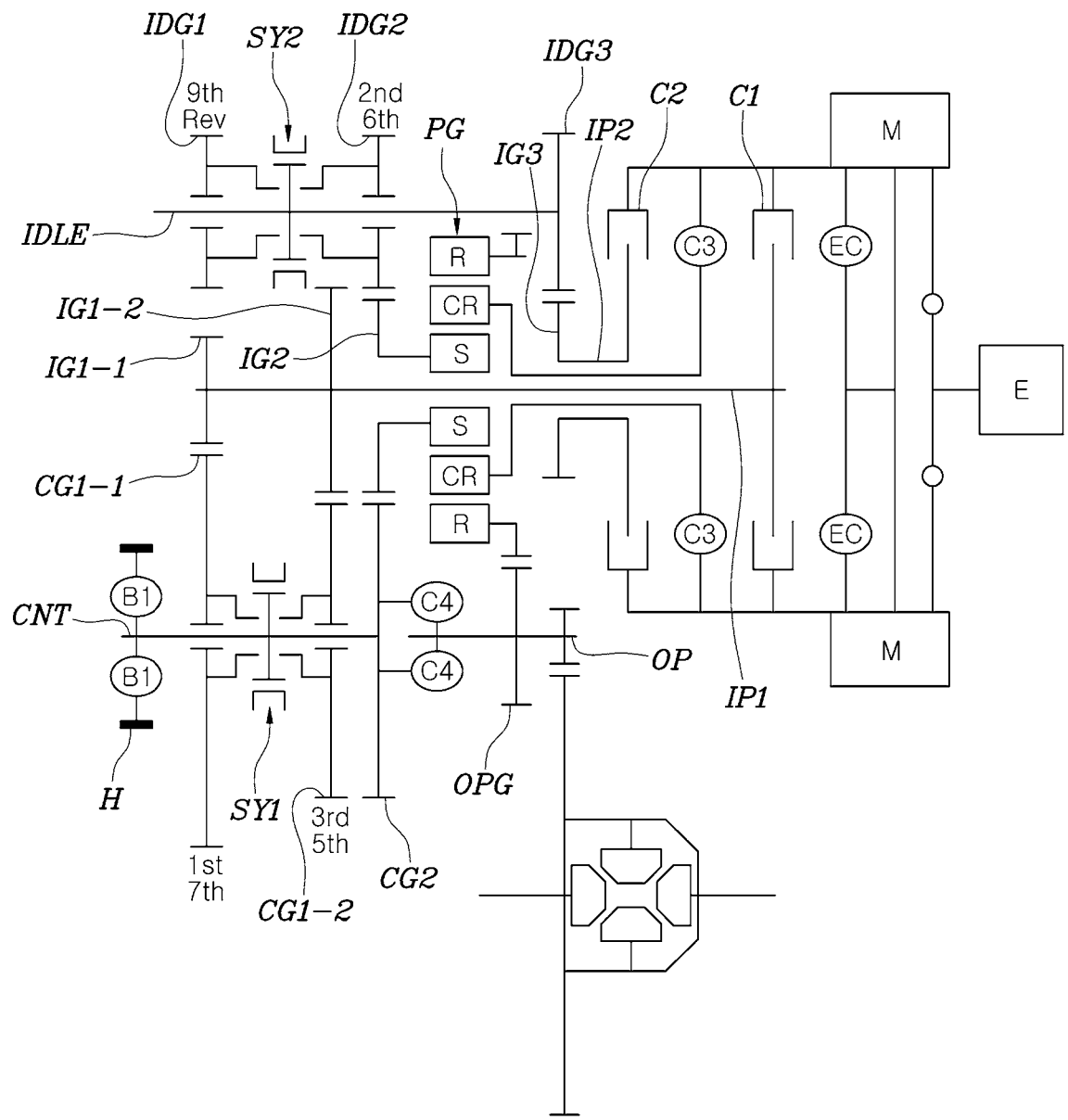
FIG. 5 is a drawing of various exemplary embodiments structure of a hybrid dual clutch transmission of nine forward speeds according to an exemplary embodiment of the present invention.

Furthermore, as various exemplary embodiments disposing the drive motor M, to explain referring from FIG. 5 to FIG. 7, the drive motor M may be directly connected to the first clutch C1 and the second clutch C2 to supply a rotational power, and an engine clutch EC may be additionally disposed between the engine E and the drive motor M so that the rotational power of the engine E may be selectively transmitted.

That is, as shown in FIG. 6 and FIG. 7, the drive motor M and the engine clutch EC are added to the structure implementing nine forward speeds and one reverse speed, so that a vehicle can travel by implementing the engine mode and the parallel mode as well as EV mode.

Meanwhile, referring to FIG. 1, the planetary gear set PG of the present invention may be disposed between the second external gear set EG2 and the third external gear set EG3. At the instant time, the sun gear S may be directly connected to any one external gear of the second external gear set EG2, the planet carrier CR may be directly connected to the third clutch C3, and the ring gear R may be directly connected to the external gear provided at the output shaft OP.

For example, the sun gear S may be directly connected to a second input gear IG2 forming the second external gear set EG2, the planet carrier CR may be configured so that a rotational power of the engine E may be inputted via the third clutch C3, and the ring gear R may be externally engaged with the output gear OPG directly connected to output shaft OP.

Furthermore, the first external gear set EG1 according to an exemplary embodiment of the present invention may be divided into a 1-1 external gear set EG1-1 and a 1-2 external gear set EG1-2.

First, in the 1-1 external gear set EG1-1, a 1-1 input gear IG1-1 provided at the first input shaft IP1 and a 1-1 counter gear CG1-1 provided at the countershaft CNT may be engaged in engagement state, but the shifting stage may be formed by selecting the mate of the 1-1 input gear IG1-1 and the 1-1 counter gear CG1-1 as corresponding external gear mate through a first synchronizer SY1 provided at the countershaft CNT.

Furthermore, in the 1-1 external gear set EG1-1, a first idle gear IDG1 provided in the idle shaft IDLE and the 1-1 counter gear CG1-1 provided in the countershaft CNT may be engaged in engagement state, so that the shifting stage may be formed by selecting the mate of the first idle gear IDG1 and the 1-1 counter gear CG1-1 as corresponding external gear mate through a synchronizer SY2 provided in the idle shaft IDLE.

That is, in the 1-1 external gear set EG1-1, the 1-1 input gear IG1-1 and the first idle gear IDG1 may be engaged with the 1-1 counter gear CG1-1, respectively, to be the structure that three gears are externally engaged.

Next, in the 1-2 external gear set EG1-2, a 1-2 input gear IG1-2 provided in the first input shaft IP1 and a 1-2 counter gear CG1-2 provided in the countershaft CNT may be engaged in engagement state, so that the shifting stage may be formed by selecting the mate of the 1-2 input gear IG1-2 and the 1-2 counter gear CG1-2 as corresponding external gear mate through the first synchronizer SY1 provided in the countershaft CNT.

That is, in the 1-2 external gear set EG1-2, the 1-2 input gear IG1-2 may be engaged with the 1-2 counter gear CG1-2 so that two gears are externally engaged.

Next, in the second external gear set EG2 according to an exemplary embodiment of the present invention, the second input gear IG2 directly connected to the first rotation element of the planetary gear set PG and a second counter gear CG2 directly connected to the countershaft CNT may be engaged in engagement state, and at the instant time, the second counter gear CG2 and the output shaft OP may be disposed on the same axle, the countershaft CNT and the output shaft OP are selectively connectable to each other through the fourth clutch C4 provided between the counter gear and the output shaft OP so that the corresponding shifting stage may be formed.

Furthermore, in the second external gear set EG2, a second idle gear IDG2 provided in the idle shaft IDLE and the second counter gear CG2 provided in countershaft CNT may be engaged in engagement state, so that the second idle gear IDG2 and the second counter gear CG2 as the corresponding external gear mate are selected through the second synchronizer SY2 provided in the idle shaft IDLE to form the shifting stage.

That is, in the second external gear set EG2, the second input gear IG2 and the second idle gear IDG2 may be engaged with the second counter gear CG2, respectively, to be the structure that three gears are externally engaged.

Next, in the third external gear set EG3 according to an exemplary embodiment of the present invention, a third input gear IG3 provided in the second input shaft IP2 and a third idle gear IDG3 provided in the idle shaft IDLE may be engaged in engagement state, so that the rotational power of the engine E may be transmitted to the idle shaft IDLE via the third input gear IG3 and the third idle gear IDG3 as the corresponding external gear mate through the engagement operation of the second clutch C2.

That is, in the third external gear set EG3, the third input gear IG3 may be engaged with the third idle gear IDG3 to be the structure that two gears are externally engaged.

Furthermore, the gear ratio transmitted to the output element of the planetary gear set PG via the third external gear set EG3 and the second external gear set EG2 through the second clutch C2 and the gear ratio transmitted to the output element of the planetary gear set PG through the third clutch C3 may be equal to each other.

That is, to explain by referring to FIG. 1 and FIG. 2, in a case of for example the sixth shifting stage, an engine driving torque is transmitted to the third external gear set EG3 through the second clutch C2 to rotate the idle shaft IDLE, which is transmitted to the second idle gear IDG2 through the second synchronizer SY2 to pass the second counter gear CG2 and the second input gear IG2 and then pass the sun gear S and the planet carrier CR of the planetary gear set PG to be outputted through the ring gear R.

With this, the engine driving torque is inputted to the planet carrier CR through the third clutch C3 and then to be outputted through the ring gear R. In the two ways, the gear ratios transmitted to the ring gear R are equal to each other.

According to the above mentioned structure, the present invention can form a dual clutch transmission by reducing the number of synchronizers and external gears and shafts compared to a conventional DCT structure using only external gears, reducing cost and weight of the transmission, which allows the vehicle mountability of the transmission to be improved.

Figure 8:
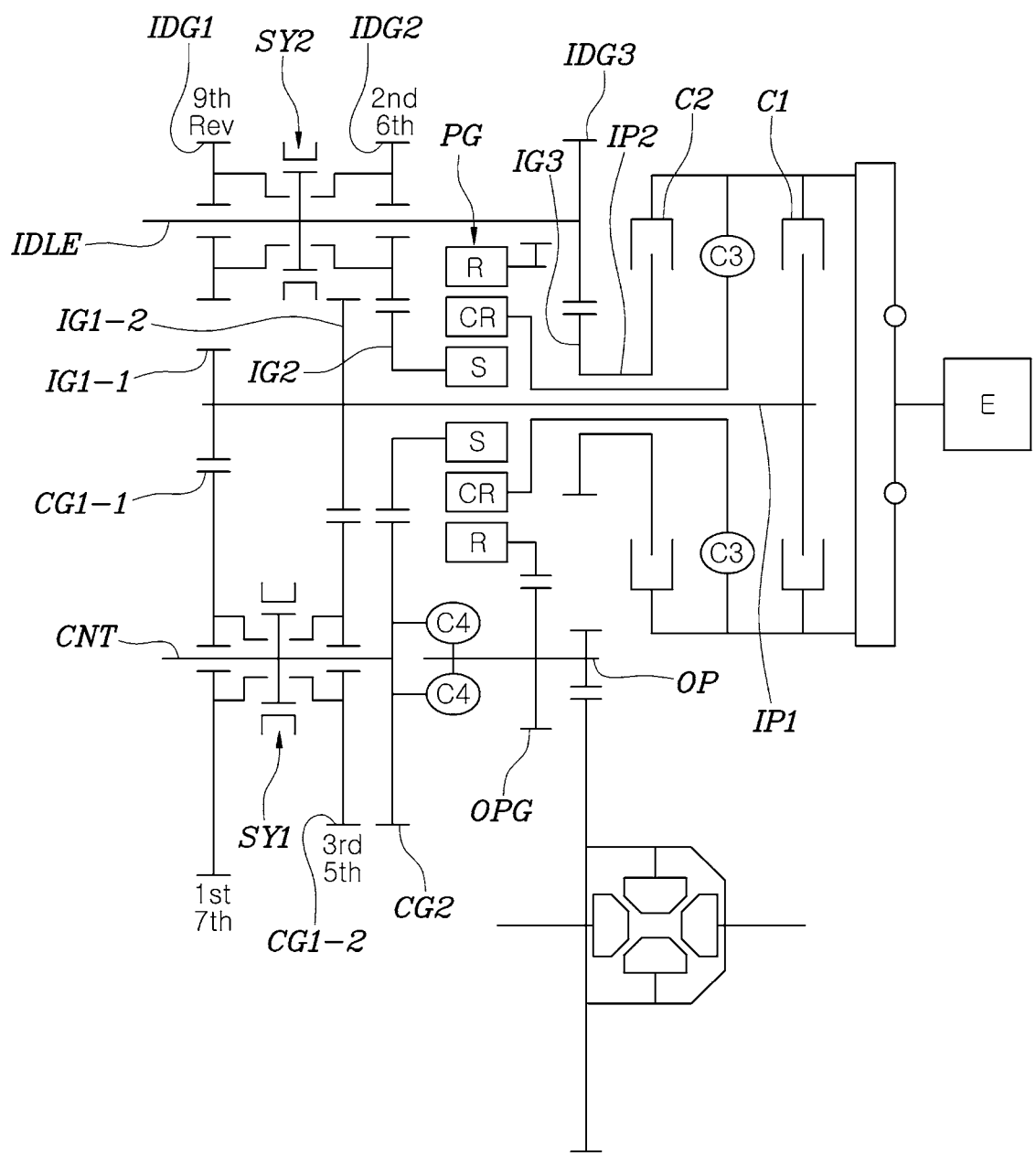
FIG. 8 is a drawing of a dual clutch transmission structure of eight forward speeds according to an exemplary embodiment of the present invention.

Meanwhile, FIG. 8 shows the structure which removes the brake B1 in the transmission shown in FIG. 1, and it can implement the transmission structure of eight forward speeds and one reverse speed as shown in FIG. 9 by removing only the brake B1.

Furthermore, through some structure changes that remove some synchro gears or some external gears in the transmission structure shown in FIG. 1, it can implement the transmission structure of the seventh, sixth, fifth forward speed, easily changing the transmission structure.

Figure 10:
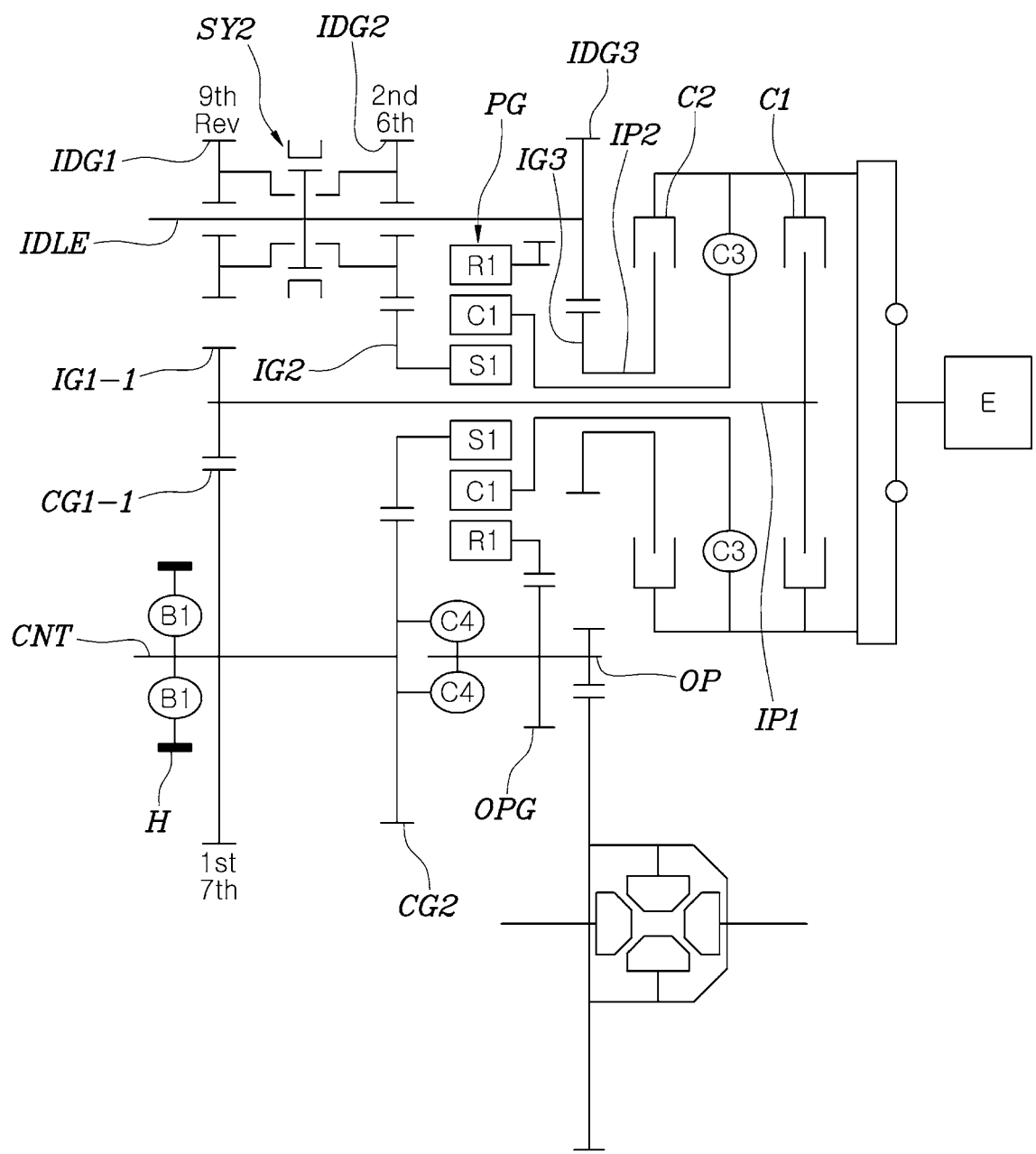
FIG. 10 is a drawing of a dual clutch transmission structure of seven forward speeds according to an exemplary embodiment of the present invention.

For example, FIG. 10 shows the structure which removes the 1-2 external gear set EG1-2 and the first synchronizer SY1 in the transmission shown in FIG. 1, and it can implement the transmission structure of seven forward speeds and one reverse speed as shown in FIG. 11.

Figure 12:
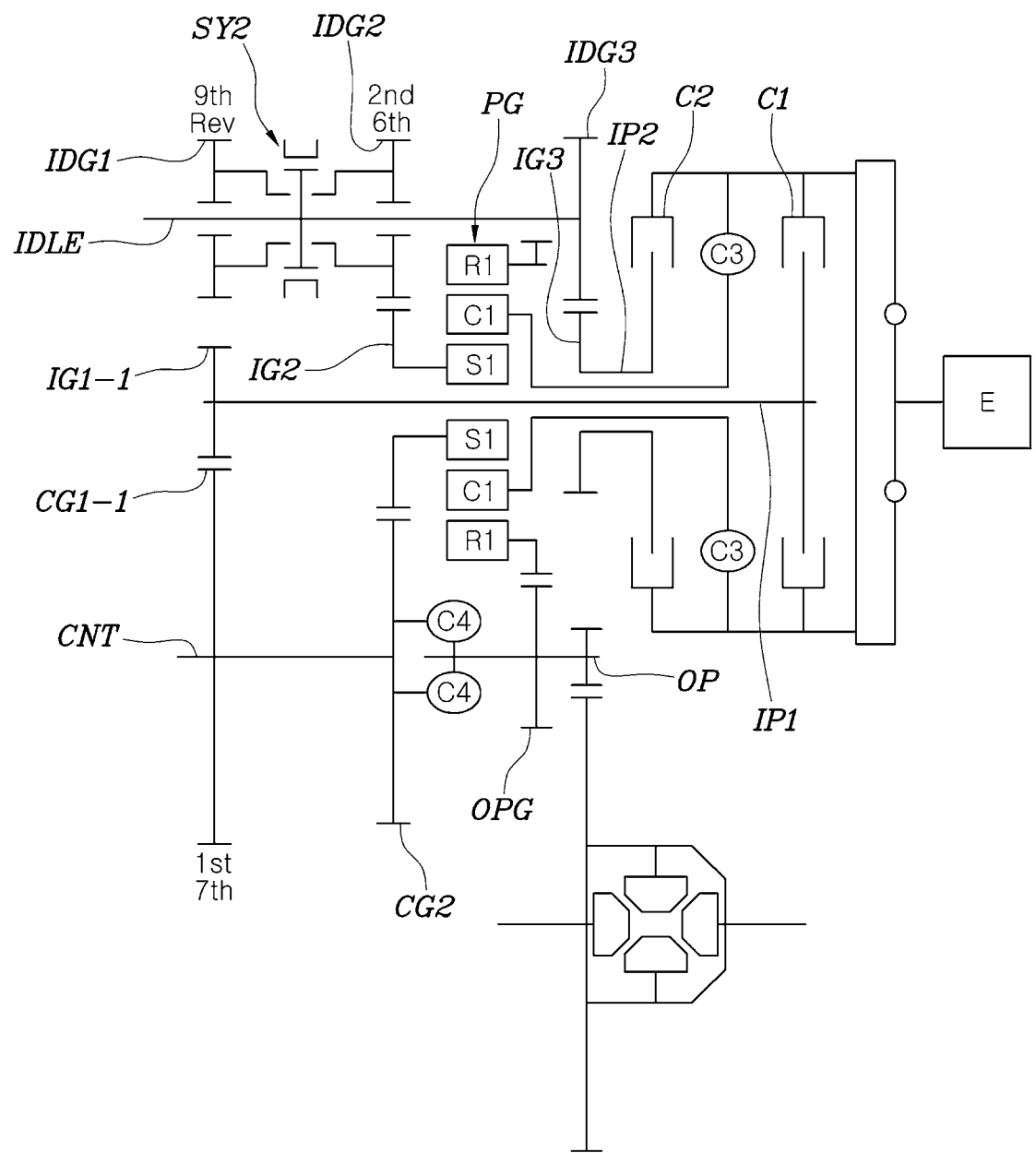
FIG. 12 is a drawing of various exemplary embodiments structure of a dual clutch transmission of six forward speeds according to an exemplary embodiment of the present invention.

Additionally, FIG. 12 shows the structure which removes the 1-2 external gear set EG1-2 and the first synchronizer SY1 and brake B1 in the transmission shown in FIG. 1, and it can implement the transmission structure of six forward speeds and one reverse speed as shown in FIG. 13.

Figure 14:
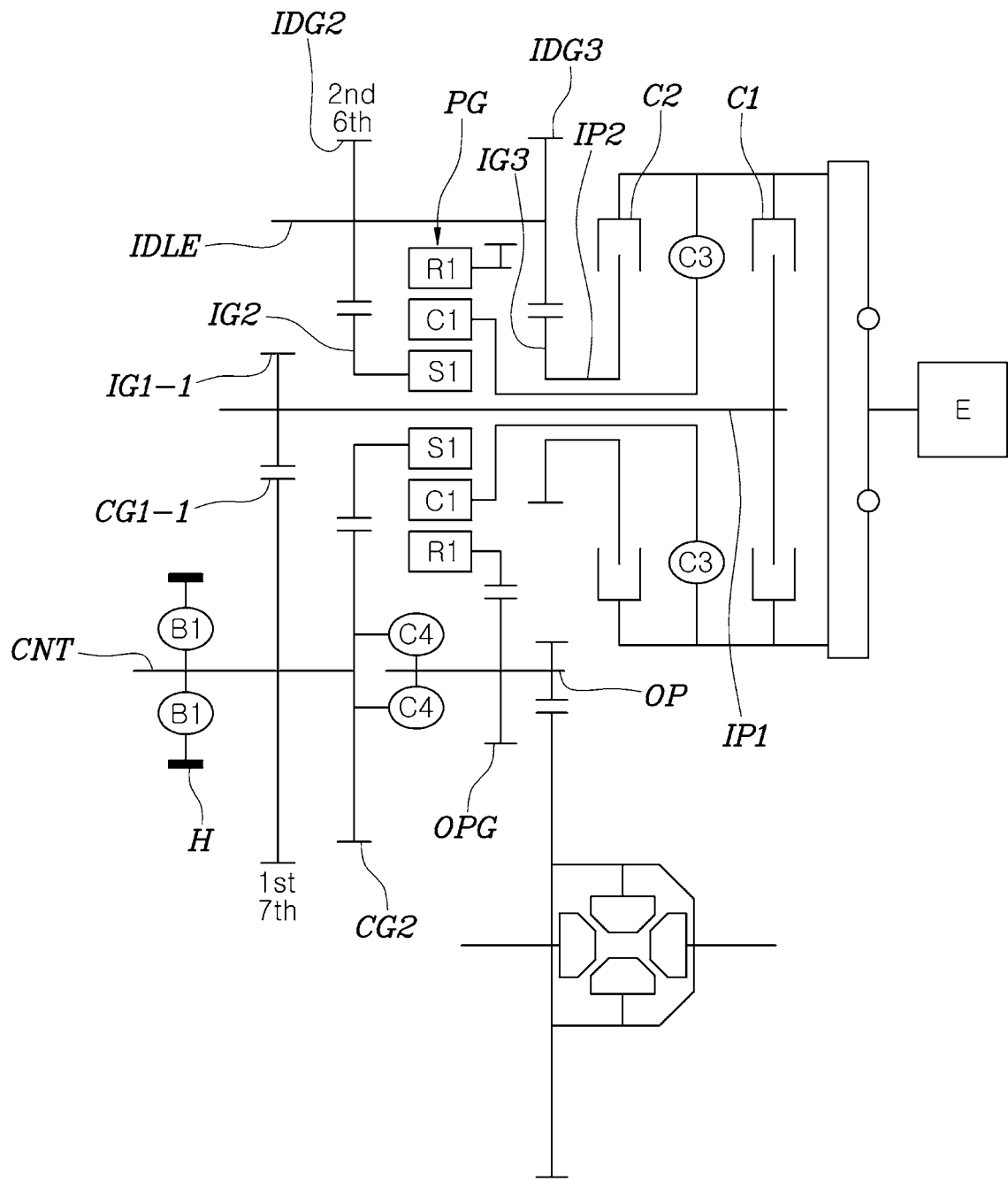
FIG. 14 is a drawing of various exemplary embodiments structure of a dual clutch transmission of six forward speeds according to an exemplary embodiment of the present invention.

Also, FIG. 14 shows the structure which removes the 1-2 external gear set EG1-2, the first synchronizer SY1, the first idle gear IDG1 and the second synchronizer SY2 in the transmission shown in FIG. 1, and directly connects the second idle gear IDG2 with the idle shaft IDLE, and it can implement the transmission structure of six forward speeds as shown in FIG. 15.

Figure 16:
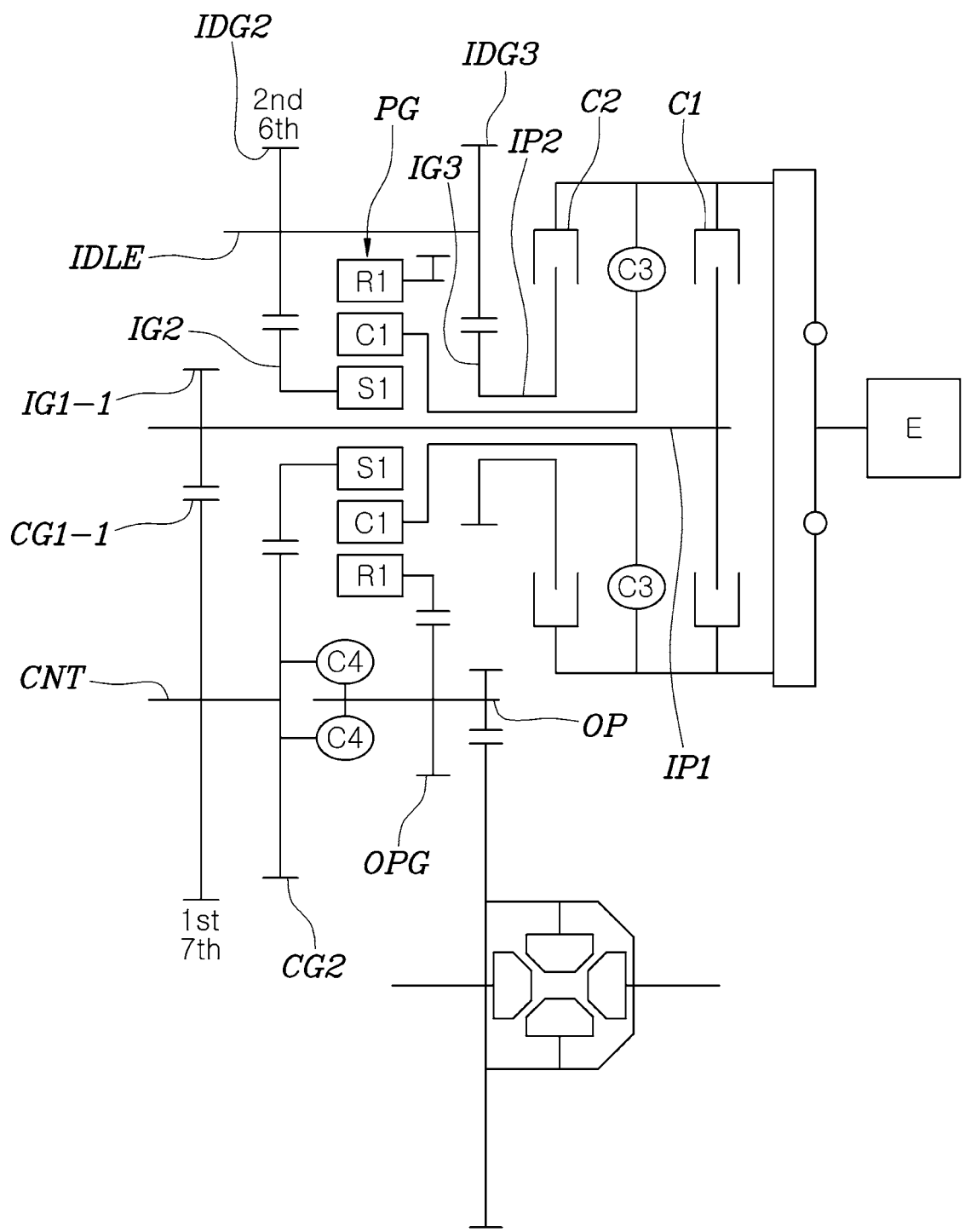
FIG. 16 is a drawing of a dual clutch transmission structure of five forward speeds according to an exemplary embodiment of the present invention.

Furthermore, FIG. 16 shows the structure which removes the 1-2 external gear set EG1-2, the first synchronizer SY1, the first idle gear IDG1, the brake B1 and the second synchronizer SY2 in the transmission shown in FIG. 1, and directly connects the second idle gear IDG2 with the idle shaft IDLE, and it can implement the transmission structure of five forward speeds as shown in FIG. 17.

Meanwhile, the present invention can implement a transmission of three forward speeds and four forward speeds, which is configured to include the first input shaft IP1, the second input shaft IP2, the countershaft CNT, the output shaft OP, the planetary gear set PG and the external gear set EG.

Figure 18:
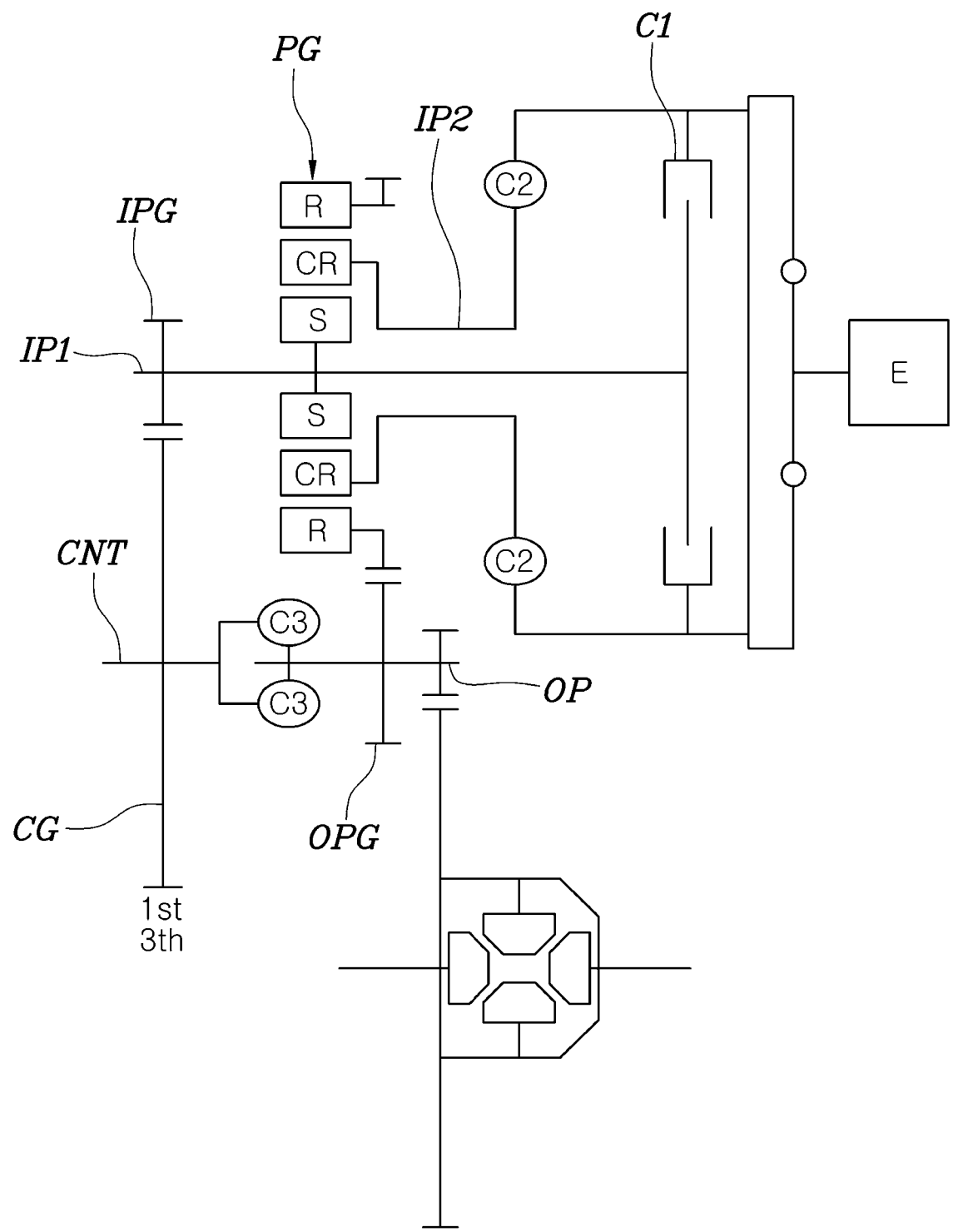
FIG. 18 is a drawing of a dual clutch transmission structure of three forward speeds according to an exemplary embodiment of the present invention.

To explain referring to FIG. 18 and FIG. 19, firstly, the first input shaft IP1 and the second input shaft IP2 may selectively receive a rotational power of the engine E through a dual clutch, for example, the first clutch C1 may be disposed between the first input shaft IP1 and the engine E to be rotatable, which connects the first input shaft IP1 with the engine E or disconnects the first input shaft IP1 from the engine E, and the second clutch C2 may be disposed between the second input shaft IP2 and the engine E to be rotatable, which connects the second input shaft IP2 with the engine E or disconnects the second input shaft IP2 from the engine E.

The first input shaft IP1 and the second input shaft IP2 may be disposed on the same axle. That is, the first input shaft IP1 becomes a solid shaft and the second input shaft IP2 becomes a hollow shaft so that the first input shaft IP1 is inserted into the second input shaft IP2.

Furthermore, the countershaft CNT may be disposed IP2 side by side on the side of the first input shaft IP1 and the second input shaft.

Furthermore, the output shaft OP may be selectively connectable to the countershaft CNT through the third clutch C3, and a final reduction gear externally engaged with a differential device may be directly connected to the output shaft OP together with the output gear OPG.

At the instant time, the output shaft OP and the countershaft CNT may be disposed side by side on the same axle, and the output shaft OP may be disposed closer to the engine E than the countershaft CNT.

The planetary gear set PG may include three rotation elements of which the first rotation element may be connected to the first input shaft IP1 so that a rotational power of the engine E is selectively inputted thereto through the first clutch C1, the second rotation element may be connected to the second input shaft IP2 so that a rotational power of the engine E is selectively inputted thereto through the second clutch C2, and the third rotation element is directly connected to the output shaft OP.

Furthermore, in the external gear set EG, the external gear provided in the first input shaft IP1 and the external gear provided in the countershaft CNT may be engaged in engagement state.

For example, the input gear IPG directly connected to the first input shaft IP1 and the counter gear CG directly connected to the countershaft CNT may be engaged in engagement state, but the countershaft CNT and the output shaft OP may be disposed on the same axle and the countershaft CNT may be selectively connectable to the output shaft OP through the third clutch C3 provided therebetween, through which the corresponding shifting stage may be formed.

That is, the present invention, as like FIG. 18 and FIG. 19, implements three forward speeds through the combination of external gears together with a dual clutch, a pair of planetary gear set, one clutch, so that the number of synchronizers, external gears and shafts may be reduced, reducing cost and weight of the transmission, which allows mountability of the transmission in the vehicle to improve.

Furthermore, the present invention may be configured to further include the brake B1 connected between the countershaft CNT and the transmission housing H to selectively brake the countershaft CNT.

Figure 20:
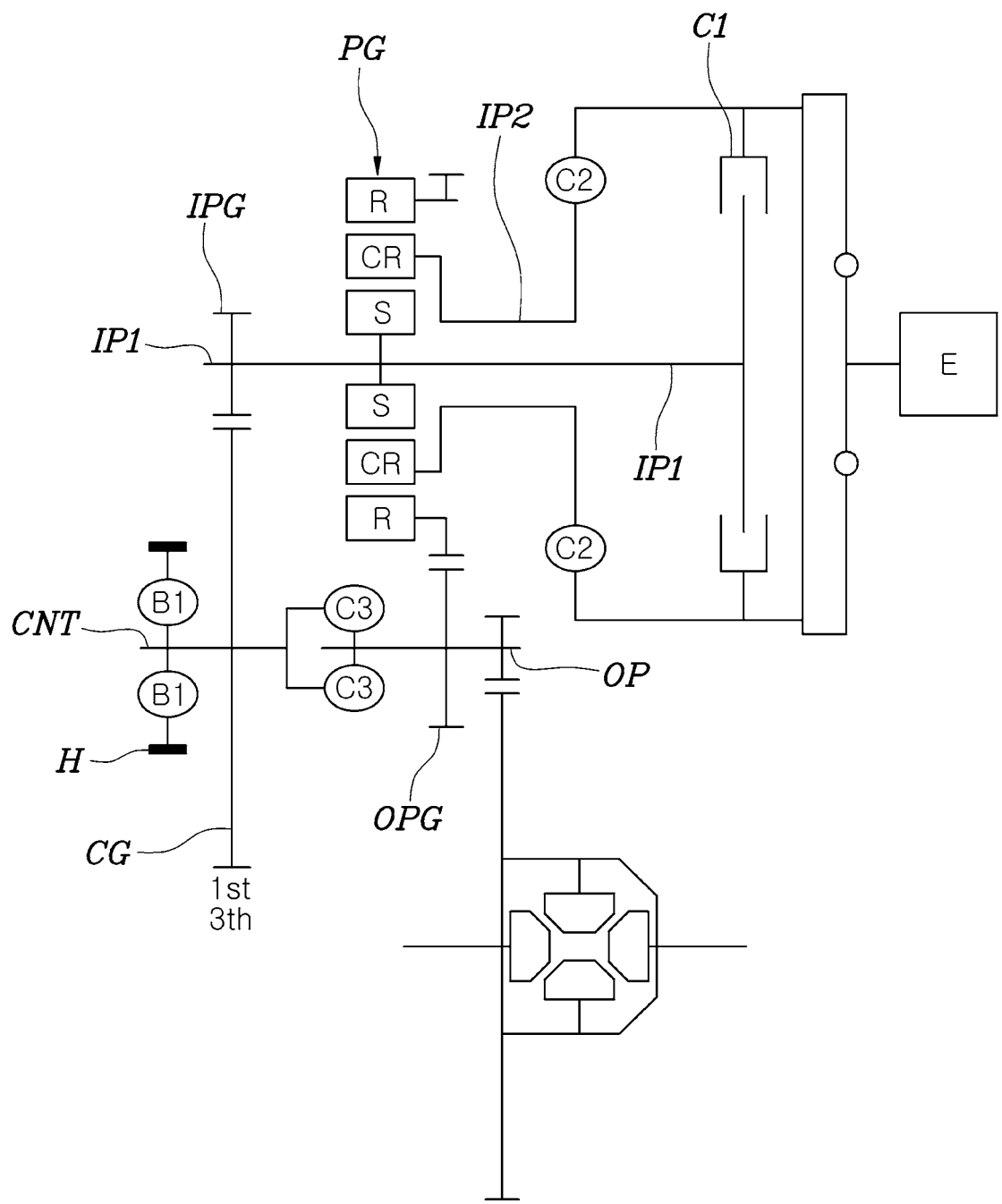
FIG. 20 is a drawing of a dual clutch transmission structure of four forward speeds according to an exemplary embodiment of the present invention.

That is, FIG. 20 shows the structure of adding the brake B1 to the transmission structure shown in FIG. 18, and it can Implement the transmission of four forward speeds as like FIG. 21 by adding only the brake B1 to FIG. 18, so that the constituent elements of the transmission may be reduced to reduce cost and weight of the transmission, improving mountability of the transmission in the vehicle.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A dual clutch transmission comprising:
   a first clutch, a second clutch, a third clutch, and a fourth clutch;
   a first input shaft to which the first clutch is mounted and a second input shaft to which the second clutch is mounted, wherein a rotational power of an engine connected to the first clutch and the second clutch is selectively inputted to the first input shaft and the second input shaft by operation of the first clutch and the second clutch;
   an idle shaft and a countershaft disposed in parallel with the first input shaft and the second input shaft;
   an output shaft, wherein the fourth clutch is mounted between the countershaft and the output shaft and wherein the output shaft is selectively connectable to the countershaft by operation of the fourth clutch;
   a planetary gear set including first, second, and third rotation elements, wherein the first rotation element is engaged to a gear provided on the idle shaft so that a rotational power of the first rotation element is inputted to the gear, the rotational power of the engine is selectively inputted to the second rotation element by the third clutch, and the third rotation element is engaged to the output shaft;
a first external gear set including a plurality of gears provided on the first input shaft, the idle shaft and the countershaft;
a first engaging device;
a second external gear set including a plurality of gears provided on the first input shaft, the idle shaft and the countershaft, wherein the gear engaged to the first rotation element is a gear among the plurality of gears in the second external gear set and is fixedly connected to one rotation element of the three rotation elements of the planetary gear set;
a second engaging device; and
a third external gear set including a plurality of gears provided on the second input shaft and the idle shaft which are engaged to each other.

2. The dual clutch transmission of claim 1, further including:
a brake mounted between the countershaft and a transmission housing to selectively connect the countershaft to the transmission housing.

3. The dual clutch transmission of claim 1, further including:
a drive motor engaged to the first rotation element of the planetary gear set to provide a rotational power of the drive motor to the first rotation element.

4. The dual clutch transmission of claim 1,
wherein a motor input shaft is disposed in parallel with the first input shaft;
wherein the motor input shaft is provided with a motor input gear;
wherein a drive motor is connected to the motor input shaft to provide a rotational power to the motor input gear; and
wherein the motor input gear is engaged with the gear among the plurality of gears of the second external gear set.

5. The dual clutch transmission of claim 4, wherein the one rotation element is the first rotation element.

6. The dual clutch transmission of claim 1, further including:
a drive motor fixedly connected to the first clutch and the second clutch; and
an engine clutch mounted between the engine and the drive motor to selectively transmit a rotational power of the engine.

7. The dual clutch transmission of claim 1,
wherein the planetary gear set is a single pinion planetary gear set, and
wherein the first rotation element, the second rotation element, and the third rotation element are a sun gear, a planet carrier and a ring gear, respectively, and disposed on a same axis with the first and second input shafts.

8. The dual clutch transmission of claim 7,
wherein the planetary gear set is disposed between the second external gear set and the third external gear set; and
wherein the sun gear is the one rotation element fixedly connected to the gear among the plurality of gears of the second external gear set, and
wherein the planet carrier is fixedly connected to the third clutch and the ring gear is engaged to a gear provided on the output shaft.

9. The dual clutch transmission of claim 1,
wherein the first engaging device includes a first synchronizer and the second engaging device includes a second synchronizer,
wherein the plurality of gears of the first external gear set includes a first external gear unit and a second external gear unit,
wherein the first external gear unit includes:
a first input gear member fixed to the first input shaft;
a first counter gear member rotatably mounted on the countershaft; and
a first idle gear rotatably mounted to the idle shaft,
wherein the first input gear member and the first counter gear member are engaged to each other and are selectively connected to the countershaft through the first synchronizer provided on the countershaft, and
wherein the first idle gear and the first counter gear member are engaged to each other and are selectively connected to the idle shaft through the second synchronizer provided on the idle shaft, and
wherein the second external gear unit includes:
a second input gear member fixed to the first input shaft; and
a second counter gear member rotatably mounted on the countershaft,
wherein the second input gear member and the second counter gear member are engaged to each other and are selectively connected to the countershaft through the first synchronizer provided on the countershaft.

10. The dual clutch transmission of claim 9, wherein the first synchronizer selectively couples the counter shaft to one of the first counter gear member and the second counter gear member.

11. The dual clutch transmission of claim 1,
wherein the second engaging device includes a second synchronizer,
wherein the plurality of gears of the second external gear set includes a second input gear which is the gear among the plurality of gears in the second external gear set, a second idle gear and a second counter gear, and
wherein the second input gear rotatably mounted on the first input shaft and fixedly connected to the first rotation element of the planetary gear set is engaged to the second counter gear fixedly connected to the countershaft, the second counter gear and the output shaft are disposed on a same axis, and the countershaft and the output shaft are selectively connectable to each other through the fourth clutch provided therebetween; and
wherein the second idle gear rotatably mounted on the idle shaft and the second counter gear fixed to the countershaft are engaged to each other and are selectively connected to the idle shaft through the second synchronizer provided on the idle shaft.

12. The dual clutch transmission of claim 11, wherein the second synchronizer selectively couples the idle shaft to second idle gear.

13. The dual clutch transmission of claim 1,
wherein the plurality of gears of the third external gear set includes a third input gear and a third idle gear, and
wherein the third input gear fixed to the second input shaft and a third idle gear fixed to the idle shaft are engaged to each other and the rotational power of the engine is transmitted thereto through operation of the second clutch.

14. The dual clutch transmission of claim 13, wherein a gear ratio transmitted to an output element of the first, second, and third rotation elements of the planetary gear set via the third external gear set and the second external gear set through the second clutch and a gear ratio transmitted to the output element of the planetary gear set through the third clutch are equal to each other.

* * * * *